Oct. 2, 1934.　　　A. M. ERICKSON　　　1,975,261
FRUIT DICING MACHINE
Filed March 9, 1932　　　4 Sheets-Sheet 1

INVENTOR.
ARVID M. ERICKSON.
BY
ATTORNEY

INVENTOR.
ARVID M. ERICKSON.
BY *Jas. M. Naylor*
ATTORNEY

Patented Oct. 2, 1934

1,975,261

UNITED STATES PATENT OFFICE 1,975,261

FRUIT DICING MACHINE

Arvid M. Erickson, San Jose, Calif., assignor to Barron Gray Packing Company, San Jose, Calif., a corporation of California Application March 9, 1932, Serial No. 597,694

6 Claims. (Cl. 146—78)

This invention relates to fruit dicing machines of the type which are designed to cut the fruit into small cubes such as are suitable for fruit salads and the like, as well as decorative purposes in preparing other foods.

One of the principal objects of the invention is to provide a device which will operate as efficiently on cooked as raw fruit, cutting the same neatly without mashing the soft segments during the cutting operation. Experience has taught me that the known devices of this general class do not satisfactorily cut cooked fruit but rather crush it out of the desired symmetrical shape in the intermediate cutting steps and thus permit irregular cutting in the final steps.

Another object of the invention is to provide a device which is continuous in operation and which requires no attention while running.

Another object of the invention is the provision of a dicing machine the parts of which are subject to little wear and tear and which has few working parts.

Objects of the invention will become more apparent as the specification proceeds and from study of the accompanying drawings, and the particular novelty of the device will be pointed out in the appended claims.

Figure 1:
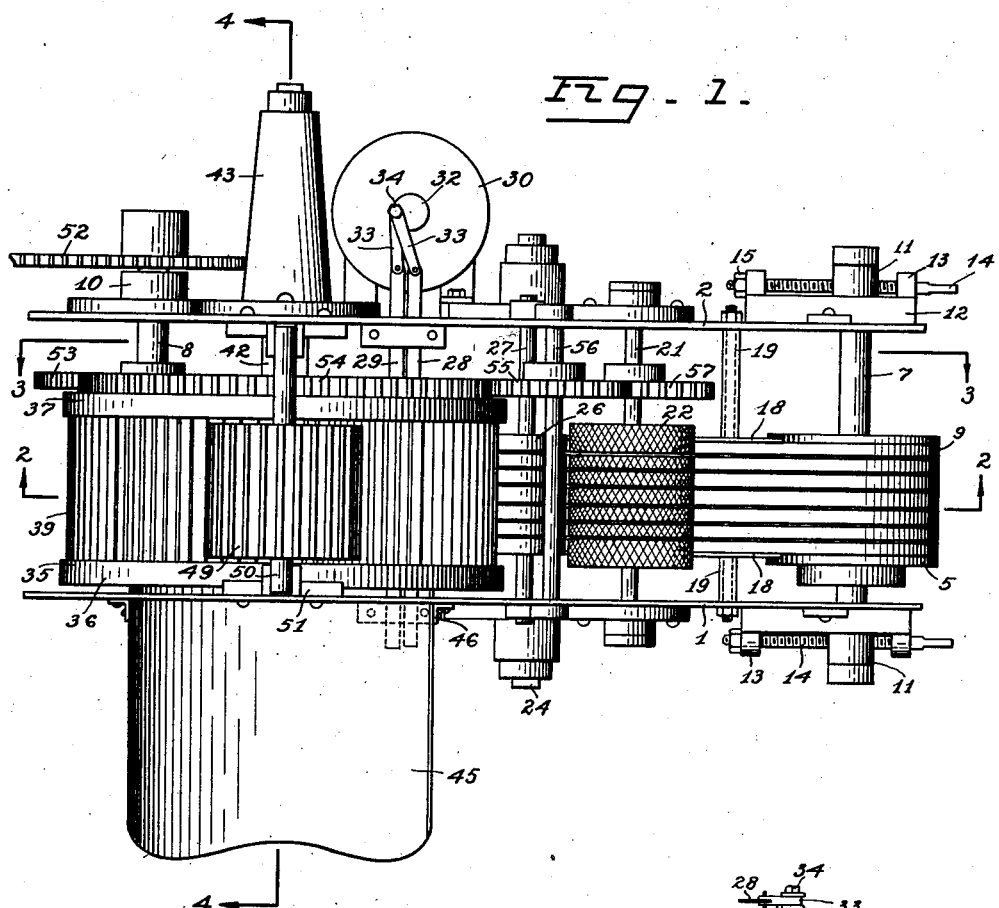
Figure 1 is a plan view of the invention.
Figure 6:
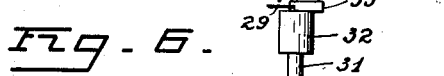
Figure 5:
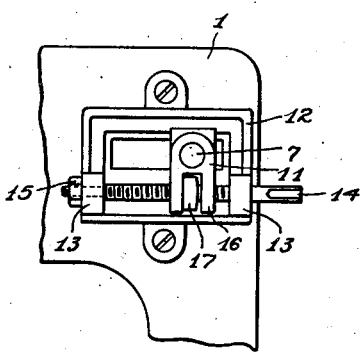
Figure 7:
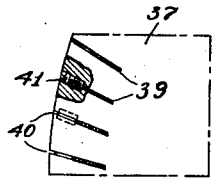
Figure 3:
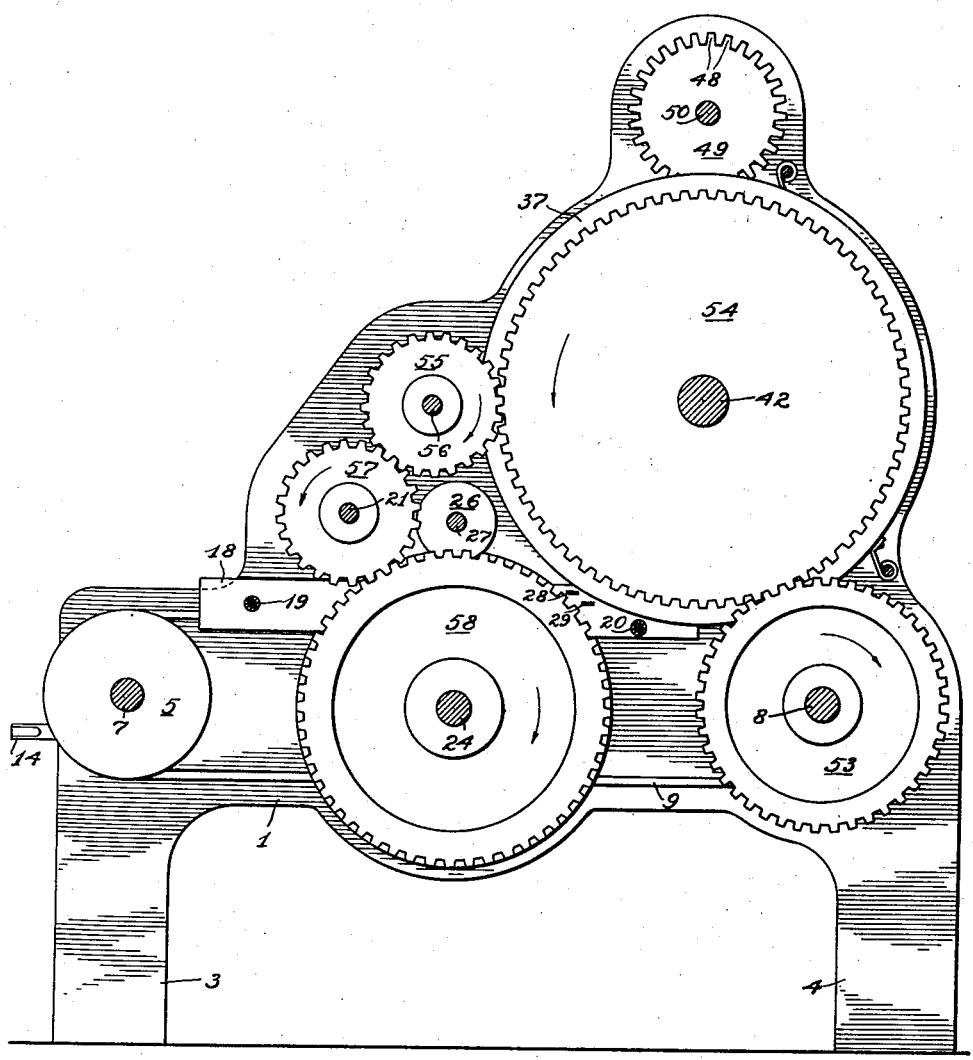
Figure 3 is a section along the line 3—3 of Figure 1.
Figure 4:
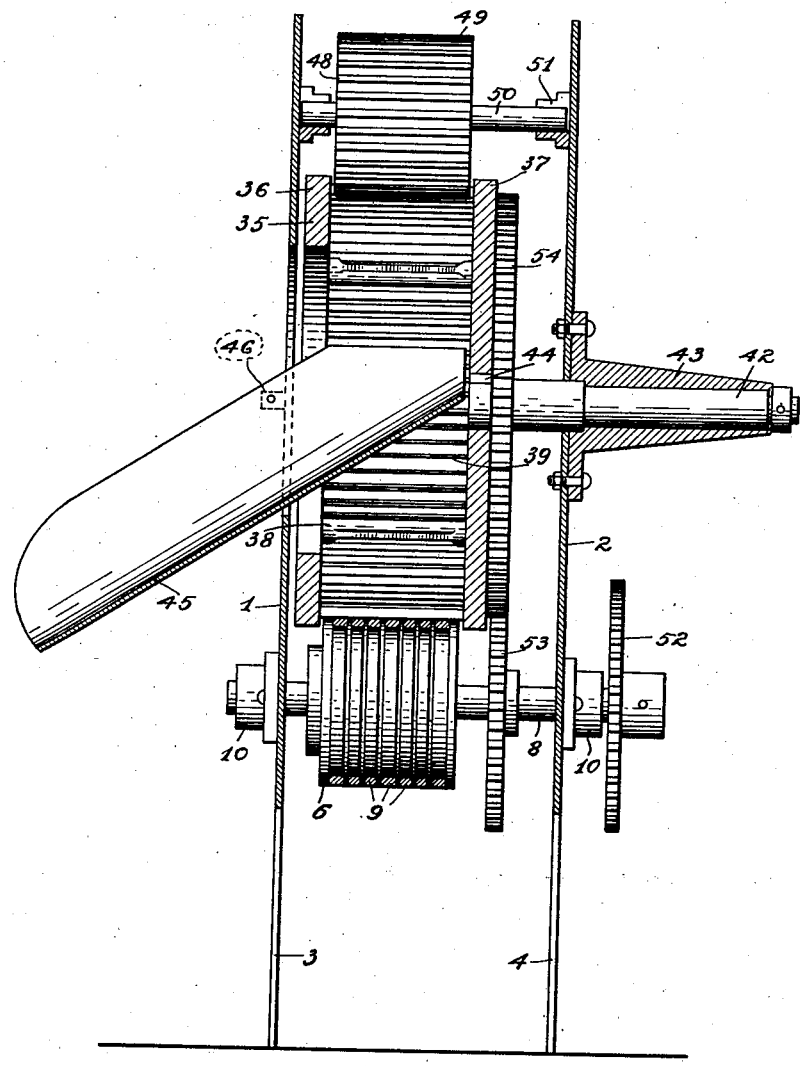

Figure 4 is a sectional view of the device taken along the line 4—4 of Figure 1, some of the parts, for purposes of clarity, being shown in elevation, Figure 5 is a side elevation of the means employed to adjust the tension of the endless conveyor belts, Figure 6 illustrates the means used to reciprocate the horizontal cutting knives, and Figure 7 is a fragmentary view of a section of the drum used in the final cutting step, showing the novel method of mounting the knives in the periphery thereof.

The mechanism employed is suspended between the vertical frame members 1 and 2, having legs, 3 and 4, respectively, the frame members being spaced by the mounting of the shafts carrying the members to be hereinafter described.

At opposite ends of the lower portion of the device pulleys 5 and 6 are mounted on the shafts 7 and 8, respectively, to support the series of endless conveyor belts 9. The surfaces of the pulleys 5 and 6 are channeled, as shown in Figure 4, to keep the belts 9 in spaced relation to each other. The shaft 8 is journaled in suitable bearings 10, while the shaft 7 is journaled in the bearing members 11, mounted in the adjusting means shown in Figure 5, to regulate the tension of the endless belts 9.

This adjusting means consists generally of the apertured frame 12 fitted over a slot in the main frame member 1, or 2 as the case may be. Apertured ears or lugs 13 project from the frame member 12 at opposite ends thereof, through which the adjusting screw 14, is thrust. One end of said screw 14 is machined to receive a wrench while the opposite end is provided with nut 15 seated in a recess in one of the ears 13. Legs 16 depending from the bearing member 11 are apertured to receive the screw 14 and a lock nut 17 is disposed upon the screw 14 therebetween.

Side wall members 18 are disposed upon either side of the belts 9 and project slightly thereabove to form guiding means for the fruit travelling in the direction of the cutting mechanisms. These side walls are supported at either end by the encased rods 19 and 20.

Mounted on the shaft 21, which is journaled in suitable bearing members secured to the outside of the main frame members, I provide what I term a pressing drum or roller 22, having a roughened surface and being designed to press the fruit downwardly upon the belts in preparation for its engagement with the vertical rotary cutting knives 23. The drum 22 is slotted or channeled, as shown in Figure 1, to receive the edges of the rotary knives 23 thus insuring that all fruit passing along the belts 9 is cut vertically by the said knives 23.

These knives are held in fixed position on the shaft 24 to pass between the belts 9, by means of the spacers 25 keyed to the shaft 24. Rotation of the knives 23 being counterclockwise, the tendency of the fruit to be carried upwardly and away from the belts 9 after receiving the vertical cuts is overcome by provision of the secondary pressing drum or roller 26, mounted on the shaft 27, directly in back of the drum 22, and also slotted to receive the edges of the knives 23.

It will be noted that thus far the operation of my device has been to keep the fruit moving along in a horizontal plane on the surface of the belts 9, even while being cut vertically by the knives 23. The fruit is maintained in this same position when cut horizontally by the two reciprocating knives 28 and 29, which are thrust through the walls of the main frame members 1 and 2, and disposed directly above the belts 9 and behind the knives 23. The knife 28 is positioned slightly above and in front of the knife 29 to permit a closer arrangement of the knives 23 and the cutting drum 35 thus confining the actual cutting operations to a relatively small area and minimizing the possibility of the fruit getting out of alignment while being cut.

A motor 30 mounted on the frame member 2 and having a shaft member 31 provided with a cap 32, supplies the thrust to the reciprocating knives 28 and 29, the latter being connected by the pieces 33, to a post 34 seated eccentrically in the cap 32, as shown in Figure 6.

After leaving the reciprocal knives 28 and 29, the fruit passes under a cutting drum 35 which completes the cutting of the fruit by making a vertical cross cut therein.

The cutting drum 35 comprises a pair of disks 36 and 37 held in spaced relation to each other by the bars 38. The knives 39 span the disks 36 and 37 adjacent the peripheries thereof and are maintained in the slots 40 therein by means of the set-screws 41, as shown in Figure 7. It will be noted that the knives 39 are disposed slightly off center with respect to the disks 36 and 37 in order that the final cut in the fruit, and particularly soft or cooked fruit, will be neatly made, experience having proved that this result is not obtained when the knives are diametrically disposed.

The drum 35, thus formed, is supported and rotated by the shaft 42 journaled in the bearing 43 mounted on the frame 2. The shaft 42, it will be observed, extends only through the disk 37 and the latter is secured thereon by the key 44 in the said shaft, as shown in Figure 4.

The disk 36, and the corresponding section of the main frame member 1, are apertured to receive an inclined discharge chute 45 in communication with the interior of the drum 35 and attached to the main frame 1 by the angle pieces 46.

Figure 2:
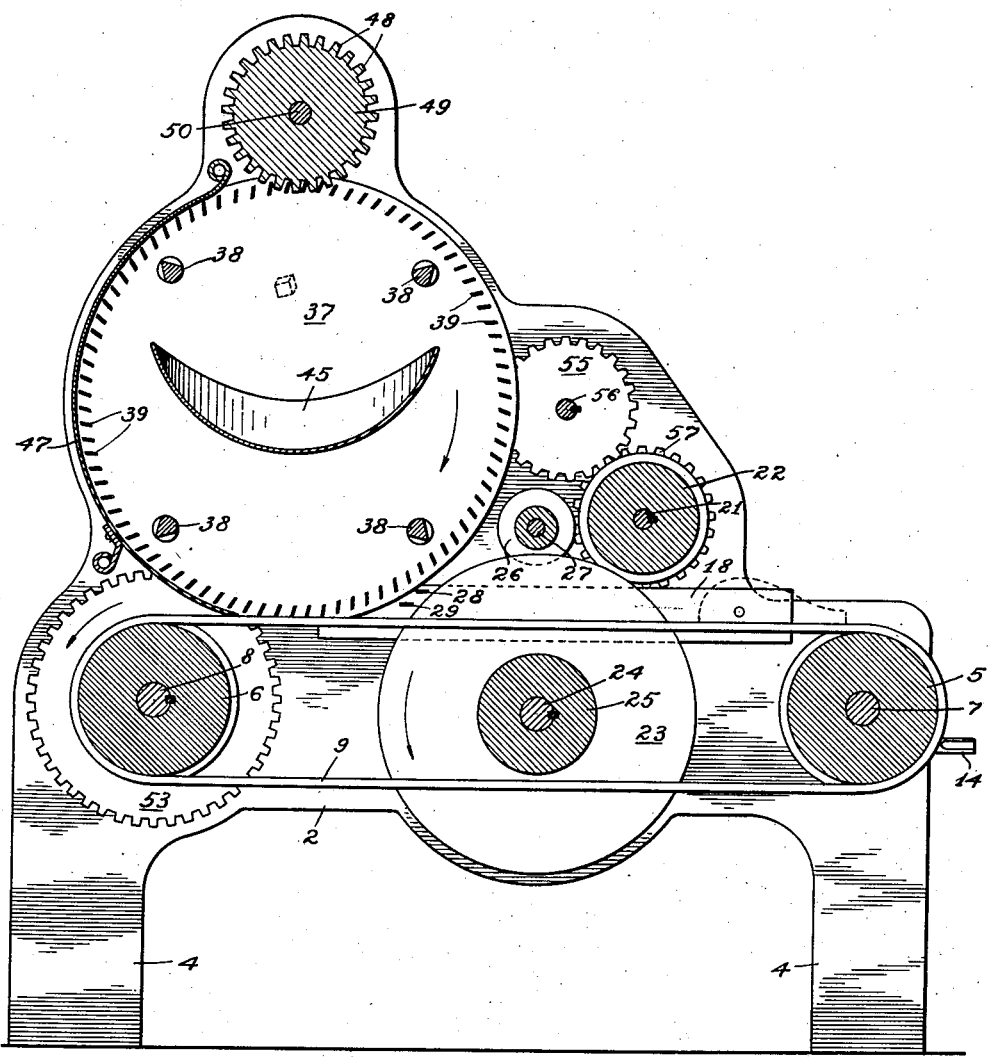
Figure 2 is a section along the line 2—2 of Figure 1.

A shield 47 mounted on the frame members 1 and 2 at the back of the device and conforming to the shape of the exposed arc of the drum 35, prevents the diced or completely cut fruit wedged between the knives 39 from falling therefrom before reaching the top of the swing of the drum where it is thrust into the discharge chute 45 by the teeth 48 of the idler gear 49. The latter is mounted on the shaft 50 which is journaled in the helf-bearings 51 secured to the inner faces of the frame members 1 and 2. The sole function of the gear 49 is to rotate with the drum 35 and by means of its teeth 48 entering between the knives 39 in the drum 35 thrust the fruit (shown in dotted lines in Figure 2) downwardly into said chute 45.

The drive of the various cutting mechanisms not already explained is accomplished as follows: Power is transmitted to the shaft 8 through the gear 52 mounted on the end thereof outside of the main frame member 2, thus rotating the pulley 6 carrying the endless belts 9. A second spur gear 53, mounted on the shaft 8 between the main frame member 2 and the drum 35 engages the teeth of the gear 54 rigidly secured to the outer face of the disk 37 of the drum 35. The gear 54 engages the gear 55 mounted on the shaft 56 which in turn engages the gear 57 on the shaft 21 rotating the pressing drum 22. The gear 57 then engages a larger gear 58 on the shaft 24 turning the rotary knives 23. The rotational direction of the aforementioned gears is indicated in the drawings by appropriate arrows.

The operation of the device is as follows: The fruit to be diced, which has already been partly prepared by removal of seeds, stones, cores and the like, is fed onto the endless conveyor belts 9, moving in the direction of and under the cutting unit proper, by which means they are conveyed to and through the rotary vertical knives 23. After having been sliced longitudinally by the latter knives, the fruit passes between the reciprocal knives 28 and 29 disposed on a horizontal plane between the vertical rotary knives 23 and the periphery or rim of the drum 35. These reciprocal knives are spaced to slice the fruit on the horizontal, the distance between them being substantially equal to the distance between the rotary vertical knives 23.

The endless belts carry the fruit, which to this stage has been twice cut, under the drum whereupon the knives disposed in the periphery thereof complete the dicing by transversely cutting the fruit. In this connection it will be noted that the knives 39 in the drum press downwardly on the conveyor belt to complete the cut in each instance, thereby insuring complete severance of the segments. The fruit which has thus been completely diced clings or becomes wedged between the knives in the drum and is carried upwardly to substantially the top of the revolution of the drum 35 where the teeth 48 of the idler gear 49 enter the spaces between the knives and discharge the fruit into the chute 45.

Having thus described my invention, what I claim is:

1. In a fruit dicing machine, a series of spaced endless conveyor belts, a drum pressing the fruit onto the said conveyor belts, vertical cutting knives disposed between said endless conveyor belts, reciprocal blades spaced behind said vertical knives and a drum with transversely extending blades in the periphery thereof designed to press downwardly onto said belts and complete the cutting operation of the fruit being carried by the latter.

2. In a fruit dicing machine, a series of endless conveyor belts, rotary knives disposed vertically between said conveyor belts, reciprocating knives horizontally disposed behind said rotary knives, a cutting drum having transversely extending blades in the periphery thereof disposed behind said reciprocating knives, drums engaging with said rotary knives and cooperating with the latter and said conveyor belts to insure even presentation of the fruit to said reciprocal knives and said cutting drum, a discharge chute in communication with the interior of said cutting drum, and means engaging with said cutting drum to discharge the cut fruit wedged between the blades in the periphery thereof into said chute.

3. In a fruit dicing machine, a series of spaced endless conveyor belts, vertical cutting knives disposed between said endless conveyor belts, reciprocal blades spaced behind said vertical knives, drums pressing the fruit onto said belts, and a drum with transversely extending blades in the periphery thereof designed to press downwardly onto said belts and complete the cutting operation of the fruit being carried by the latter.

4. In a fruit dicing machine, a series of spaced endless conveyor belts, vertical cutting means disposed between said endless conveyor belts, reciprocal cutting means spaced behind said vertical cutting means, drums pressing the fruit onto said belts, and a drum with transversely extending cutting means in the periphery thereof designed to press downwardly onto said belts and complete the cutting operation of the fruit being carried by the latter.

5. In a fruit dicing machine, a series of spaced endless conveyor belts, vertical cutters disposed between said endless conveyor belts, reciprocal cutters spaced behind said vertical cutters, rollers pressing the fruit onto said belts, and a drum with transversely extending cutters in the periphery thereof designed to press downwardly onto said belts and complete the cutting operation of the fruit being carried by the latter.

6. In a fruit dicing machine, a series of spaced endless conveyor belts, vertical cutters disposed between said endless conveyor belts, a roller adapted to press the fruit onto said belts and through said vertical cutters, reciprocal cutters spaced behind said vertical cutters, a roller adapted to press the fruit onto said belts and into said reciprocal cutters as it leaves said vertical cutters, and a drum with transversely extending cutters in the periphery thereof designed to press downwardly onto said belts and complete the cutting of the fruit being carried by the latter.

ARVID M. ERICKSON.